United States Patent
Eriksson et al.

[11] Patent Number: 6,137,882
[45] Date of Patent: Oct. 24, 2000

[54] ADAPTIVE ECHO CANCELLATION METHOD

[75] Inventors: Anders Eriksson, Uppsala, Sweden; Johnny Karlsen, Cary, N.C.

[73] Assignee: Telefonaktiebolaget LM Ericsson, Stockholm, Sweden

[21] Appl. No.: 09/057,791

[22] Filed: Apr. 9, 1998

Related U.S. Application Data

[63] Continuation of application No. PCT/SE96/01239, Oct. 2, 1996.

[30] Foreign Application Priority Data

Oct. 11, 1995 [SE] Sweden .................................. 9503545

[51] Int. Cl.[7] ..................................................... H04M 1/00
[52] U.S. Cl. ............................................ 379/410; 379/406
[58] Field of Search ..................................... 379/390–392, 379/399, 402–404, 406–411; 370/286–291; 455/222–223, 226.3, 295–296, 307, 569–570

[56] References Cited

U.S. PATENT DOCUMENTS

| | | | |
|---|---|---|---|
| 3,789,165 | 1/1974 | Campanella et al. | 379/411 |
| 4,129,753 | 12/1978 | Duttweiler | 379/410 |
| 4,405,840 | 9/1983 | Zebo | 379/411 |
| 4,491,701 | 1/1985 | Duttweiler et al. | 379/410 |
| 4,712,235 | 12/1987 | Jones, Jr. | 379/410 |
| 5,570,423 | 10/1996 | Walker et al. | 379/410 |
| 5,631,900 | 5/1997 | McCaslin et al. | 370/287 |

FOREIGN PATENT DOCUMENTS

93/09608  5/1993  WIPO .............................. H04B 3/23

OTHER PUBLICATIONS

Slock, Dirk T., "On the Convergence Behavior of the LMS and the Normalized LMS Algorithms", IEEE Transactions on Signal Processing, v41 n9, p2811–2825, 1993.

*Primary Examiner*—Stella Woo
*Assistant Examiner*—George Eng
*Attorney, Agent, or Firm*—Burns, Doane, Swecker & Mathis, L.L.P.

[57] ABSTRACT

An adaptive echo cancellation method determines a long time average of an input signal and a short time average of the same signal, and prevents updating of an adaptive filter if the short time average falls below the long time average.

10 Claims, 2 Drawing Sheets

ADAPTIVE ECHO CANCELLATION METHOD

This application is a continuation of International Application No. PCT/SE96/01239, which was filed on Oct. 2, 1996, which was designated the United States, and which is expressly incorporated here by reference.

TECHNICAL FIELD

The present invention relates to an adaptive echo cancellation method in which adaption of an echo canceller is prevented in an environment with low signal to background noise ratio.

BACKGROUND OF THE INVENTION

Echo is a problem related to the perceived speech quality in telephony systems with long delays, e.g. telephony over long distances or telephony systems using long processing delays, like digital cellular systems. The echo arises in the four-to-two wire conversion in the PSTN/subscriber interface. To remove this echo, echo cancellers are usually provided in transit exchanges for long distance traffic, and in mobile services switching centers for cellular applications.

Due to the location of the echo canceller it is made adaptive; the same echo canceller is used for many different subscribers in the PSTN. This adaption is necessary not only between different calls, but also during each call, due to the non-fixed nature of the transmission network, e.g. phase slips, three-party calls, etc.

A problem with this filter adaption process is that the filter may diverge if the input signal decreases to a level that approaches the background noise level. To prevent the filter from diverging in situations where the background noise level is comparable to the signal level, it has been suggested in WO 93/09608 to inhibit updating of the filter when the power of the input signal is less than a given threshold. To overcome problems related to using a fixed threshold, the threshold is made adaptive in WO 93/09608. The method of in WO 93/09608 is based on comparison of the power of the input signal and the background noise level. The adaption is prevented if the power of the echo (power of input signal—echo path attenuation ERL) is less than the background noise level plus a margin of 1 to 5 dB.

A problem with the described approach is its dependence on an accurate estimate of the echo path attenuation ERL. If a large value of ERL is estimated, the adaption may be completely inhibited. Hence, the filter coefficients are frozen, and, assuming ERL is estimated from the filter coefficients, no new estimate of ERL will be found. If the characteristics of the echo generating system now change, the filter will not be able to adapt to the new situation. Thus, the method suggested in WO 93/09608 is too conservative, i.e. filter updating is inhibited also in situations where this should be avoided.

SUMMARY OF THE INVENTION

An object of the present invention is to provide an adaptive echo cancellation method in which adaption of an echo canceller is prevented in an environment with low signal to background noise ratio only when absolutely necessary.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
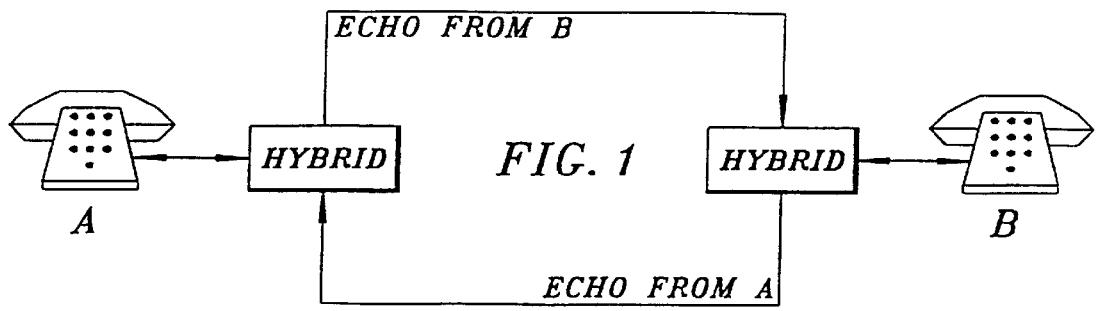
FIG. 1 is a block diagram of an echo generating system.

FIG. 1 illustrates the echo generating process in a telephony system. A subscriber A, called the far end subscriber below, is connected to a hybrid (a hybrid forms the interface between a four-wire and a two-wire connection, as is well known in the art) over a two-wire line. Similarly a subscriber B, called the near end subscriber below, is connected to another hybrid over a two-wire line. The two-wire lines transfer both incoming and outgoing speech signals. Outgoing speech from far end subscriber A is transferred to near end subscriber B over the upper two-wire line in FIG. 1. Similarly outgoing speech from near end subscriber B is transferred to far end subscriber A on the lower two-wire line in FIG. 1. However, the lower two-wire line from subscriber B to subscriber A also contains an echo of outgoing speech from subscriber A, which the hybrid at subscriber B was not able to suppress completely. Similarly the upper two-wire line in FIG. 1 contains echo from outgoing speech from subscriber B.

Figure 2:
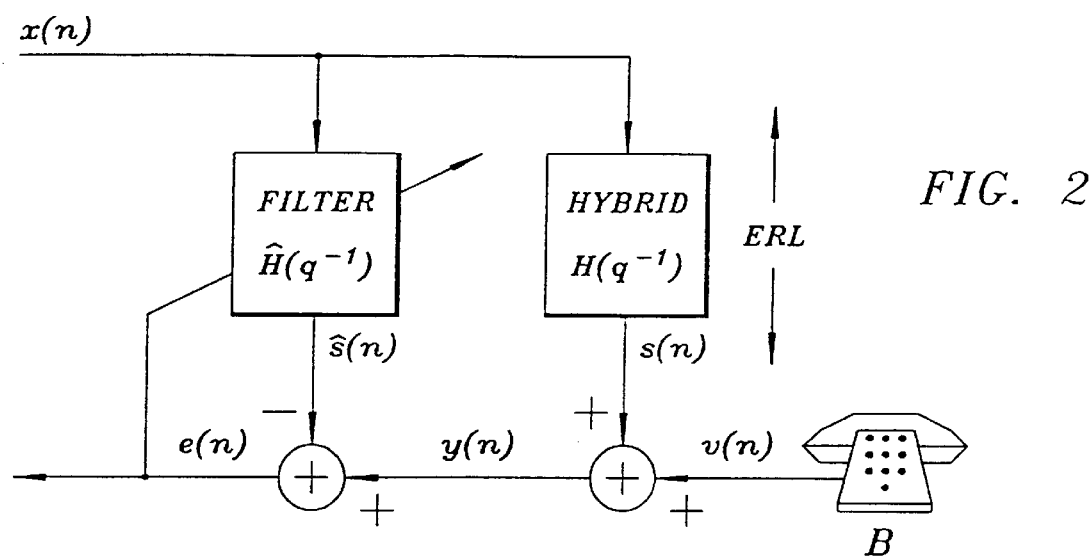
FIG. 2 is a block diagram of an echo cancellation system.

FIG. 2 illustrates how the echo back to subscriber A is cancelled at the near end side (a similar arrangement is provided at the far end side). Input signal x(n), where n denotes discrete time, represents speech from subscriber A. The input signal x(n) is attenuated by the hybrid (the attenuation is represented by the echo path attenuation −ERL (ERL=Echo Return Loss)), and the resulting echo signal s(n) is combined with the near end signal v(n), which may or may not contain near end speech. Thus, the resulting output signal y(n) contains both the near end signal and echo from the far end signal. Furthermore, input signal x(n) is also forwarded to an adaptive filter, which models the impulse response of the hybrid by adjusting its filter coefficients (a typical filter length is 512 coefficients). The resulting estimate of echo signal s(n) is denoted ŝ(n). This estimate is subtracted from output signal y(n), and the resulting error signal e(n) is forwarded to the adaptive filter for adjustment of the filter coefficients and to the two-wire line back to far end subscriber A.

Often the echo s(n) is modelled using an FIR (Finite Impulse Response) model, and the estimate ŝ(n) is determined by the normalized least mean square (NLMS) method (see e.g. D. T. M. Slock, "On the convergence behavior of the LMS and the normalized LMS algorithms", IEEE Transactions on Signal Processing, 41(9):2811–2825, September 1993). For time invariant signals it can be shown that the steady-state misadjustment, i.e. the power of the error of the estimated echo, $E(ŝ(n)-s(n))^2$, for a constant step-size $\mu$ of the NLMS method equals (see e.g. D. T. M. Slock)

$$E(ŝ(n) - s(n))^2 = \frac{\mu}{2-\mu} Ev^2(n) \qquad (1)$$

where $Ev^2(n)$ is the variance of the near end noise v(n) (signal from near end subscriber B during time periods without speech). However, the error in estimate ŝ(n) is due to errors in the estimated FIR coefficients $\{b_k\}$. These FIR filter coefficient errors may be approximated by (based on eq. (45) in D. T. M. Slock)

$$E(\hat{b}_k - b_k)^2 \approx \frac{\mu}{2-\mu} \cdot \frac{1}{N} \cdot \frac{Ev^2(n)}{Ex^2(n)} \quad (2)$$

where N is the filter length. Assuming that the filter has converged in a stationary scenario, the variance of the filter coefficients is given by (2). Now, if the power of input signal x(n) decreases, (2) yields an increased steady-state variance of the filter coefficients, and the filter will diverge. If the power of x(n) increases again, the filter will re-converge, but the estimation error $E(\hat{s}(n)-s(n))^2$ may be undesirably high before the filter has re-converged. Hence, some sort of control of the update process of the filter is desirable in order to prevent the estimation error from increasing too drastically in situations with non-stationary input signal characteristics.

Figure 3:
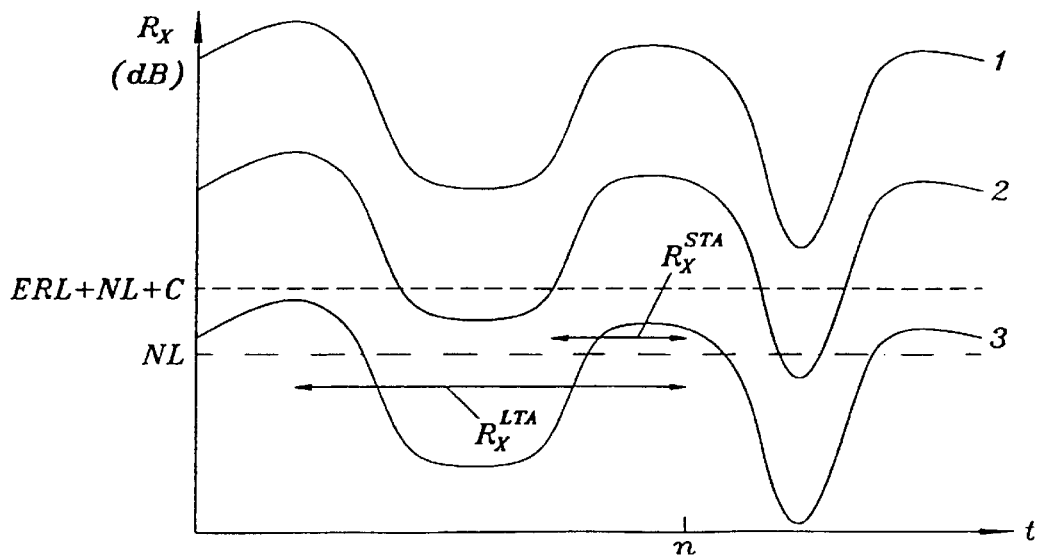
FIG. 3 is a time diagram of the input signal power to an echo canceller.

FIG. 3 illustrates the above described situation in time diagram form. Curve 1 in FIG. 3 represents the input power $R_x$ of input signal x(n). In this case the signal is rather strong and well above the noise level NL (v(n) with no near end speech), represented by the dash-dotted line in FIG. 3. In this case the filter would converge even in the valleys of the curve. However, if the distance between noise level NL and the signal is reduced, either due to a lower signal power as represented by curve 2 in FIG. 3 or by a higher noise level NL, the filter will diverge in the valleys. As mentioned above, to overcome this problem the method described in WO 93/09608 compares the power of the input signal x(n) to the background noise level NL. An adaption of the filter is prevented if the power of the echo s(n) is less than the background noise level, with a margin of 1 to 5 dB. That is, $$\frac{R_x}{ERL} < C \cdot NL \quad (3)$$

where ERL denotes an estimate of the echo path attenuation and C is a constant safety margin (in the range of 1 to 5 dB).

A problem with the approach described above is its dependence on an accurate estimate of the echo path attenuation ERL. If a large value of ERL is estimated, the adaption may be completely inhibited, since $R_x$/ERL may very well be below C·NL for all input signal levels. Hence, the filter coefficients are frozen, and, assuming ERL is estimated as the sum of the squares of the filter coefficients, no new estimate of ERL will be formed. Hence, condition (3) is too conservative. The filter may end up in an adaption deadlock. This may for instance be the case for an input signal similar to curve 3 in FIG. 3, which lies completely under the dashed line ERL+NL+C (ERL·NL·C expressed in dB).

The basic idea in accordance with the present invention to overcome this problem is to control updating of the filter by comparing a short time average $R_x^{sta}$ of the power of x(n) to a long time average $R_x^{lta}$ of the power of x(n). If the short time average falls below the long time average, filter adaption is inhibited.

This basic idea may be formalized as follows: the adaption is inhibited if $$R_x^{sta} < \max(\gamma R_x^{lta}, D) \quad (4)$$

dbm0) used to inhibit adaption during periods of both low input power and low background noise levels, and where $\gamma$ is given by $$\gamma = \min\left(\alpha, \frac{ERL \cdot NL}{R_x^{lta}}\right) \quad (5)$$

The constant $\alpha$ (>0) ensures that adaption of the filter is never completely inhibited (when the estimated value of ERL is large, $\alpha$ will be chosen in equation (5), since in this case $\alpha$ will be less than ERL·NL/$R_x^{lta}$). By choosing $\alpha \approx 1$ (for example 0.95), the filter is at least updated when the short time average $R_x^{sta}$ of the input signal x(n) exceeds the long time average $R_x^{lta}$.

The method in accordance with the present invention is illustrated in curve 3. The short double arrow $R_x^{sta}$ represents the short time average. The length of the double arrow represents the time interval over which the average is formed (typical values are 60–70 milliseconds). Similarly the double arrow designated $R_x^{lta}$ represents the long time average, which typically is computed over a time interval that is at least an order of magnitude longer than the time period for calculating the short time average, for example of the order of 4 seconds. Thus, only the most recent samples are used for calculating the short time average, while a large number of samples are used for calculating the long time average. As can be seen from the figure the short time average at sample instant n exceeds the long time average at the same instant (the distance above the t-axis represents the corresponding average). Thus, in this case (curve 3, sample instant n) the present invention would allow filter updating, while the method in accordance with the prior art would inhibit filter updating.

Figure 4:
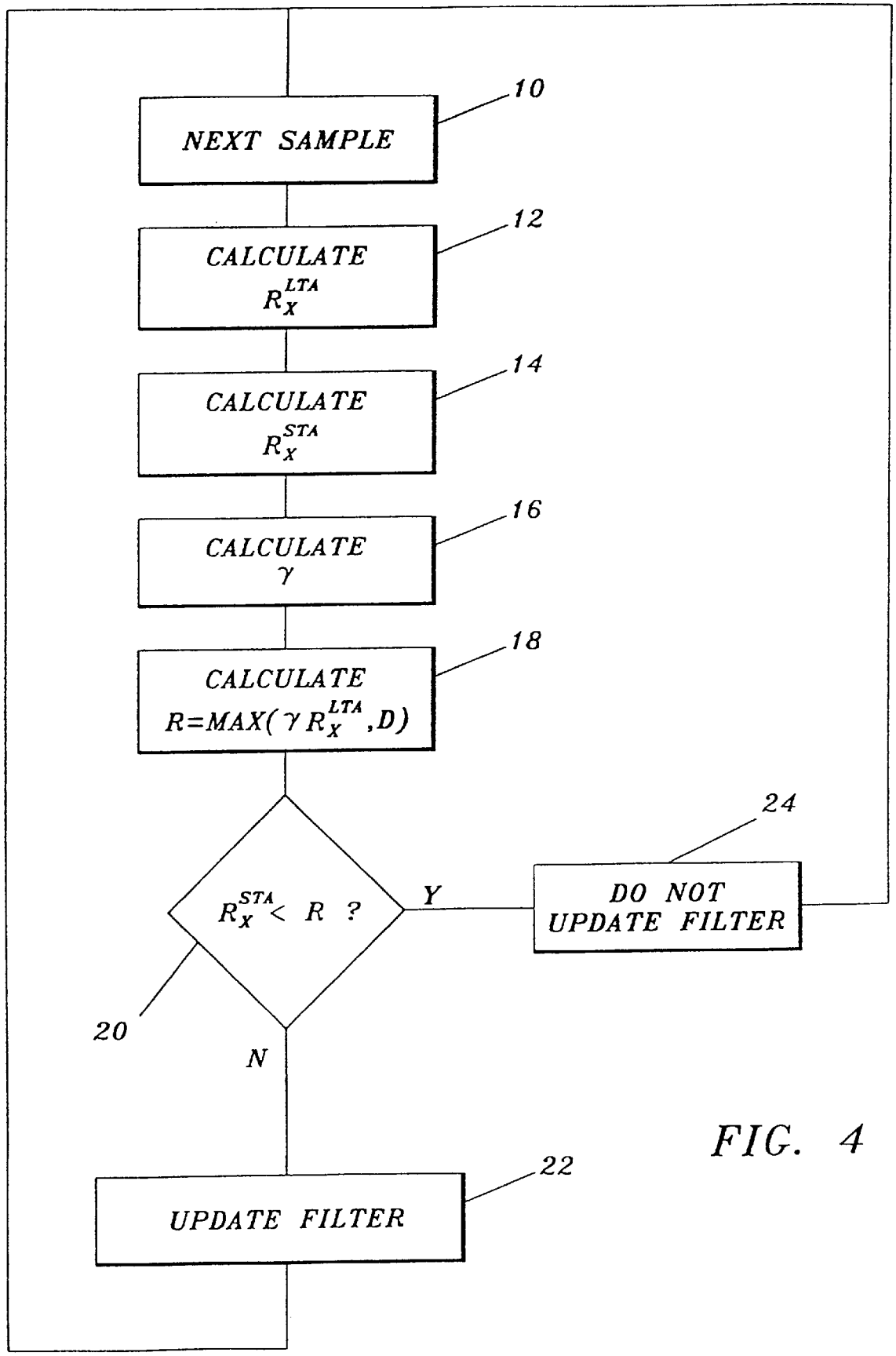
FIG. 4 is a flow chart of a preferred embodiment of the method in accordance with the present invention.

An embodiment of the method in accordance with the present invention will now be described with reference to the flow chart in FIG. 4. In step 10 the next sample of input signal x(n) is collected. In step 12 a new long time average $R_x^{lta}$ including the new sample is calculated. Similarly, in step 14 a new short time average $R_x^{sta}$ including the new sample is calculated. In step 16 $\gamma$ is calculated in accordance with (5) above. In step 16 a reference level R is calculated in accordance with the right hand side of relation (4) above. In step 20 the short time average is compared to this reference. If the short time average falls below the reference level, filter updating is inhibited in step 24, otherwise the filter is updated in step 22. Thereafter the algorithm returns to step 10 for collecting the next sample.

In a simplified embodiment of the present invention D may be set to 0, which corresponds to $-\infty$ dBm0 or zero background noise. In this case the right hand side of (4) will always equal $\gamma R_x^{lta}$.

It will be understood by those skilled in the art that various modifications and changes may be made to the present invention without departure from the spirit and scope thereof, which is defined by the appended claims.

What is claimed is:

1. An adaptive echo cancellation method in which adaption of an echo canceller is prevented in an environment with low signal to background noise ratio, comprising the steps of:

determining an echo path attenuation estimate;
   determining a noise level estimate of said environment;
   determining a long time average of recent samples of an input signal x(n) to said echo canceller;
   determining a short time average of recent samples of said input signal x(n); and
   preventing adaption of said echo canceller if said short time average is less than the maximum of said long time average multiplied by a predetermined factor and a first predetermined constant.

2. The method of claim 1, wherein said predetermined factor is given by the minimum of
   (a) a second predetermined constant, and
   (b) a product of said noise level estimate and said echo path attenuation estimate divided by said long time average.

3. The method of claim 2, wherein said first predetermined constant corresponds to a background noise level of the order of −45 dBm0.

4. The method of claim 2, wherein said second predetermined constant is approximately 1.

5. The method of claim 4, wherein said second predetermined constant is equal to 0.95.

6. The method of claim 1, wherein said short time average is formed over a time period of the order of 60–70 ms.

7. The method of claim 1, wherein said long time average is formed over a time period of the order of 4 seconds.

8. The method of claim 2, wherein said first predetermined constant equals 0, which corresponds to zero background noise.

9. An adaptive echo cancellation method in which adaption of an echo canceller is prevented in an environment with low signal to background noise ratio, comprising the steps of:
   determining an echo path attenuation estimate;
   determining a noise level estimate of said environment;
   determining a long time average of recent samples of an input signal $x(n)$ to said echo canceller;
   determining a short time average of recent samples of said input signal $x(n)$; and
   preventing adaption of said echo canceller if said short time average is less than the maximum of said long time average multiplied by a predetermined factor that varies over time and a first predetermined constant.

10. The method of claim 9, wherein said predetermined factor is given by the minimum of
    (a) a second predetermined constant, and
    (b) a product of said noise level estimate and said echo path attenuation estimate divided by said long time average.

* * * * *